(12) United States Patent
Gopalarathnam (10) Patent No.: US 11,706,293 B1
(45) Date of Patent: Jul. 18, 2023

(54) BUFFER PROFILE ASSIGNMENT MANAGEMENT BASED ON PEER NETWORK DEVICE DATA

(71) Applicant: NVIDIA Corporation, Santa Clara, CA (US)

(72) Inventor: Sudharsan Dhamal Gopalarathnam, Bothell, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/585,196

(22) Filed: Jan. 26, 2022

(51) Int. Cl.
*H04L 67/1042* (2022.01)
*H04L 67/1061* (2022.01)

(52) U.S. Cl.
CPC ...... *H04L 67/1042* (2013.01); *H04L 67/1061* (2013.01)

(58) Field of Classification Search
CPC .................. H04L 67/1042; H04L 67/1061
See application file for complete search history.

(56) References Cited

U.S. PATENT DOCUMENTS

| | | | | |
|---|---|---|---|---|
| 8,577,018 B1* | 11/2013 | Ben-Yair | ............. | H04M 3/5232 379/266.03 |
| 2012/0084364 A1* | 4/2012 | Sivavakeesar | .......... | H04W 4/60 709/205 |

\* cited by examiner

*Primary Examiner* — Duc C Ho
(74) *Attorney, Agent, or Firm* — Lowenstein Sandler LLP (57) ABSTRACT

A network device including a first data structure storing a set of buffer profile types. Each buffer profile type is associated with one or more configuration parameters. The network device further includes a second data structure storing a set of peer device identifiers, wherein each peer device identifier of the set of peer device identifiers is associated with a buffer profile type. The network device includes a buffer management application to receive first data associated with a first peer network device coupled via a first link to an interface component of the network device, determine the first data matches a first peer device identifier stored in the second data structure, and assign a first buffer profile type to the interface component of the network device, wherein the first buffer profile type is associated with the first peer device identifier in the second data structure.

20 Claims, 7 Drawing Sheets

| Neighbor field | Regex pattern | Queue/ port | Priority group | Port level buffer configuration | Buffer profile |
|---|---|---|---|---|---|
| SysName | ^Spine* | 3 | - | False | Profile 1 |
| SysName | ^Spine* | 0 | - | False | Profile 3 |
| SysName | *Host* | - | 7 | False | Profile 2 |
| PortDescription | *uplink* | | | | |
| ... | ... | ... | ... | ... | ... |
| MgmtIP | 195.192.8.* | - | - | True | Profile 4 |

| Buffer Profile | Minimum Buffer Percentage | Sharing Mode | Shared Threshold | Xon limit | Xoff limit |
|---|---|---|---|---|---|
| Profile 1 | 8 | Dynamic | 8% | 20 | 10 |
| Profile 2 | 10 | Static | 1000 kb/bytes/cells | 0 | 0 |
| Profile 3 | 12 | Dynamic | 3% | 0 | 0 |
| ... | ... | ... | ... | ... | ... |
| Profile X | 14 | Dynamic | 6% | 15 | 12 |

BUFFER PROFILE ASSIGNMENT MANAGEMENT BASED ON PEER NETWORK DEVICE DATA

TECHNICAL FIELD

At least one embodiment pertains to processing resources used to perform high-speed communication networks. For example, at least one embodiment pertains to technology for dynamically assigning a buffer profile and corresponding configuration parameters to allocate a buffer level to a communication link associated with a peer network device.

BACKGROUND

Communication systems may include multiple network devices configured to establish communication links via respective interface components (e.g., a port, a queue in a port, a priority group, etc.). A conventional network device can discover and connect with a peer or neighbor network device via an interface component. In a conventional network, the network device statically assigns a buffer profile (e.g., a buffer configuration applied to an interface component of a network device) corresponding to each communication link between an interface component of a network device and a respective peer network device. The buffer profile defines a buffer configuration of the interface component (i.e., communication endpoint) of the network device. For example, the buffer profile and buffer configuration is assigned to allocate a buffer size or buffer level for the communication link between an interface component of a network device and a discovered network device. The buffer profile can contain information about one or more configuration parameters, such as a minimum guaranteed threshold level, a shared mode setting (e.g., static or dynamic), etc.

In a typical deployment, different interface components (e.g., different ports) require different levels of buffer allocation (i.e., different buffer sizes). The buffer level allocated on a port depends on the role of the port. For example, an uplink port in a network may require a larger buffer size to be allocated than a downlink connected to a server, even though in some instances the uplink port speed matches the downlink port speed. In this regard, a group of ports with the same speed and similar roles (e.g., uplink ports) are configured with same buffer profile.

However, the current buffer assignment model is limited in that a network administrator is forced to prepare a static boot up time configuration for every device based on connection information, which is a time-consuming and manually-intensive activity. Furthermore, since conventional buffer assignments are tied to a particular interface component (e.g., a specific port number), if a port becomes nonfunctional, even if there were available ports with the same capability in the system, using a different port on a single device poses automation challenges. In addition, extending a deployment to include additional downstream devices (e.g., servers) or adding additional uplinks require re-provisioning the buffer profiles for the the newly added links.

BRIEF DESCRIPTION OF DRAWINGS

Various embodiments in accordance with the present disclosure will be described with reference to the drawings, in which.

DETAILED DESCRIPTION

A typical communication system may statically assign a specific buffer profile based on a type of device (e.g., a spine device, a host device, etc.) to which the communication link is connected. For example, all spine-connected links are assigned a first specific buffer profile. In another example, all host-connected links are statically assigned a second specific buffer profile. As such, the buffer profile is statically assigned based on the nature of the corresponding link. Furthermore, in a conventional system, desired dynamic assignment of buffer profiles by a network device cannot be achieved by a typical deployment based on the static assignment of buffer profiles to specific interface components. Advantageously, aspects of the present disclosure are directed to a dynamic buffer profile assignment model. The dynamic buffer assignment enables a buffer configuration to be assigned to an interface component (e.g., a port, queue, a priority group, etc.) of network device associated with a communication link with a discovered peer network device. A further advantage is achieved by determining a specific buffer profile of a set of different buffer profiles to dynamically assign to an interface component in view of information or data associated with the particular peer network device associated with the communication link.

Embodiments of the present application allow for multiple different buffer profiles to be generated and managed by a buffer management component of a network device. In contrast to a typical system in which a specific buffer profile is statically bound to each particular interface component of the network device, embodiments of the present application enable the dynamic assignment of a buffer profile based on data associated with the peer network device.

In an embodiment, a network device maintains a first data structure (also referred to as a "buffer profile table") storing a set of buffer profile types. In the first data structure, each buffer profile type is associated with one or more configuration parameters that can be used to configure an interface component associated with a communication link between the network device and a peer network device. In an embodiment, the network device maintains a second data structure (also referred to as a "peer network device identifier table") storing a set of peer device identifiers. In the second data structure, each of the peer device identifiers is associated with a buffer profile type of the set of buffer profile types stored in the first data structure.

According to embodiments, a network device can discover a peer network device coupled via a communication link to an interface component of the network device. To determine a buffer profile to assign to the interface component of this communication link, the network device determines information identifying the peer network device. The identified peer network device data is compared to at least a portion of the first data structure to determine a match. In an embodiment, a peer network device identifier field of the first data structure is searched using the identified peer network device data. Upon identifying a peer network device identifier in the first data structure that matches the identified peer network device data, a buffer profile type (e.g., buffer profile 1, buffer profile 2, buffer profile 3 . . . buffer profile X) associated with the peer device identifier is determined.

In an embodiment, the second data structure is used to identify one or more configuration parameters associated with the identified buffer profile type. The buffer profile type and corresponding buffer configuration parameters are assigned to the interface component corresponding to the communication link with the identified peer network device. Advantageously, the network device can use the discovered peer network data to determine a type of peer network device (e.g., a spine device, a host device, a switch, a router, a storage device, etc.) and dynamically assign a buffer profile based on the identified type of peer network device. In an embodiment, the network device can employ the first data structure and second data structure can be used to dynamically identify and assign the buffer profile to the interface component associated with the connection with the discovered peer network device.

Figure 1:
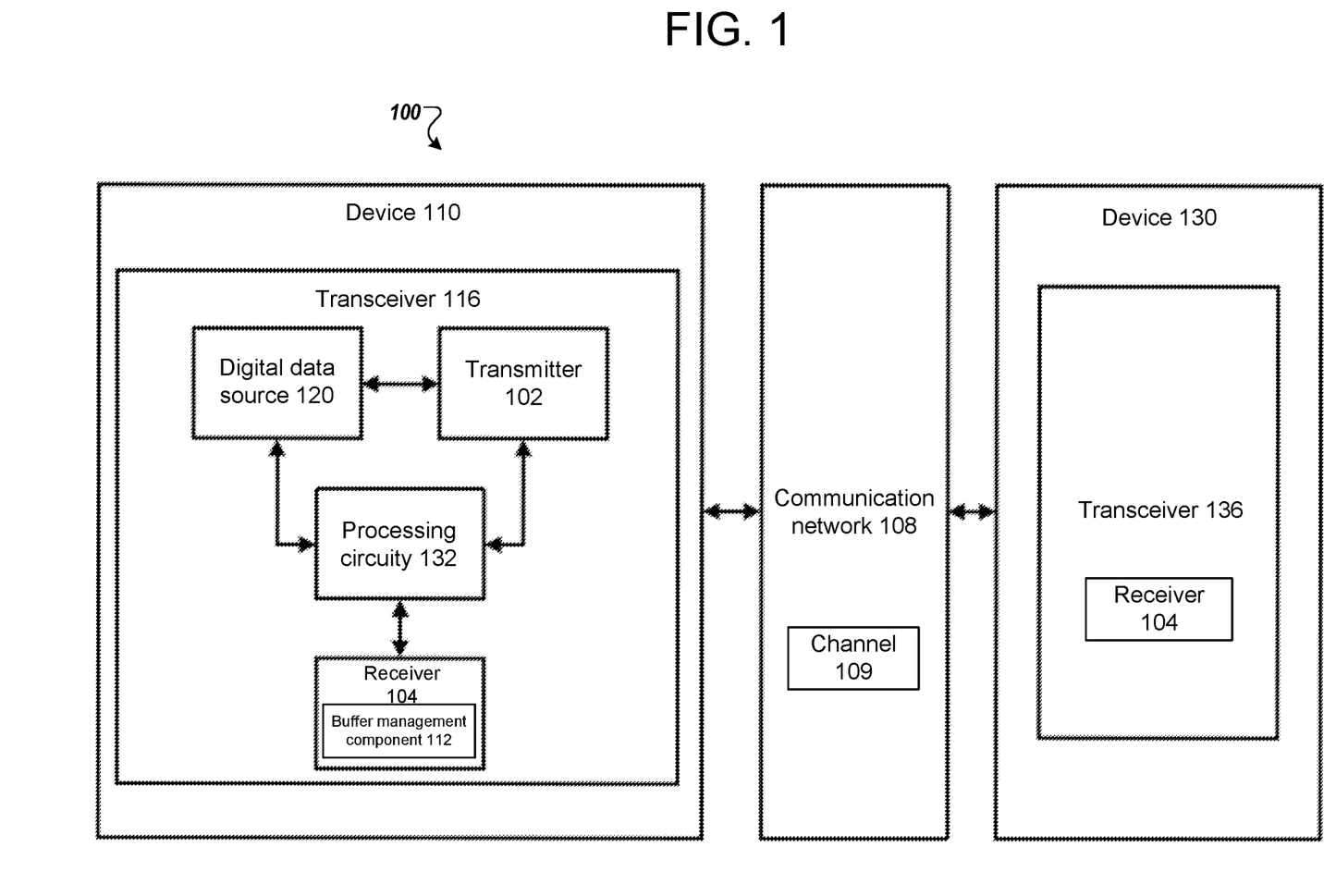
FIG. 1 illustrates an example communication system, in accordance with at least some embodiments.

FIG. 1 illustrates an example communication system 100 according to at least one example embodiment. The system 100 includes a network device 110, a communication network 108 including a communication channel 109, and a discoverable peer network device 130. In at least one example embodiment, network devices 110 and 130 correspond to one or more of any type of network device, such as a spine-connected device, a host-connected device, a router, a switch, a storage device, Personal Computer (PC), a laptop, a tablet, a smartphone, a server, a collection of servers, or the like. In some embodiments, the network devices 110 and 130 may correspond to any appropriate type of device that communicates with other devices also connected to a common type of communication network 108. According to embodiments, the receiver 104 of network devices 110 or 130 may correspond to a graphics processing unit (GPU), a switch (e.g., a high-speed network switch), a network adapter, a central processing unit (CPU), etc. As another specific but non-limiting example, the network devices 110 and 130 may correspond to servers offering information resources, services and/or applications to user devices, client devices, or other hosts in the system 100.

Examples of the communication network 108 that may be used to connect the devices 104 and 130 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables data transmission between the devices 104 and 130 using data signals (e.g., digital, optical, wireless signals). The communication network 108 may employ a communication protocol, such as link layer discovey protocol (LLDP) or other suitable protocol.

The device 104 includes a transceiver 116 for sending and receiving signals, for example, data signals. The data signals may be digital or optical signals modulated with data or other suitable signal for carrying data.

The transceiver 116 may include a digital data source 120, a transmitter 102, a receiver 104, and processing circuitry 132 that controls the transceiver 116. The digital data generator 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 124 includes suitable software and/or hardware for receiving digital data from the digital data source 120 and outputting data signals according to the digital data for transmission over the communication network 108 to a receiver 104 of peer network device 130. The network devices 110, 130 may include suitable hardware and/or software for receiving signals, for example, data signals from the communication network 108. For example, the network device 110 may include components (e.g., a buffer management component 112) identifying data associated with a discovered peer network device coupled to the network device via an interface component (e.g., a port, a queue, a priority group, etc.) and assigning a buffer profile to the interfae component based on the peer network device data, where the buffer profile includes configuration parameters to establish a buffer level for the communication link with the peer network device, as described in detail below with respect to FIG. 2-FIG. 7.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control overall operation of the transceiver 116.

The transceiver 116 or selected elements of the transceiver 116 may take the form of a pluggable card or controller for the device 110. For example, the transceiver 116 or selected elements of the transceiver 116 may be implemented on a network interface card (NIC).

The device 130 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 130 and the transceivers 116 and 120 may include other processing devices, storage devices, and/or communication interfaces generally associated with computing tasks, such as sending and receiving data.

Figure 2:
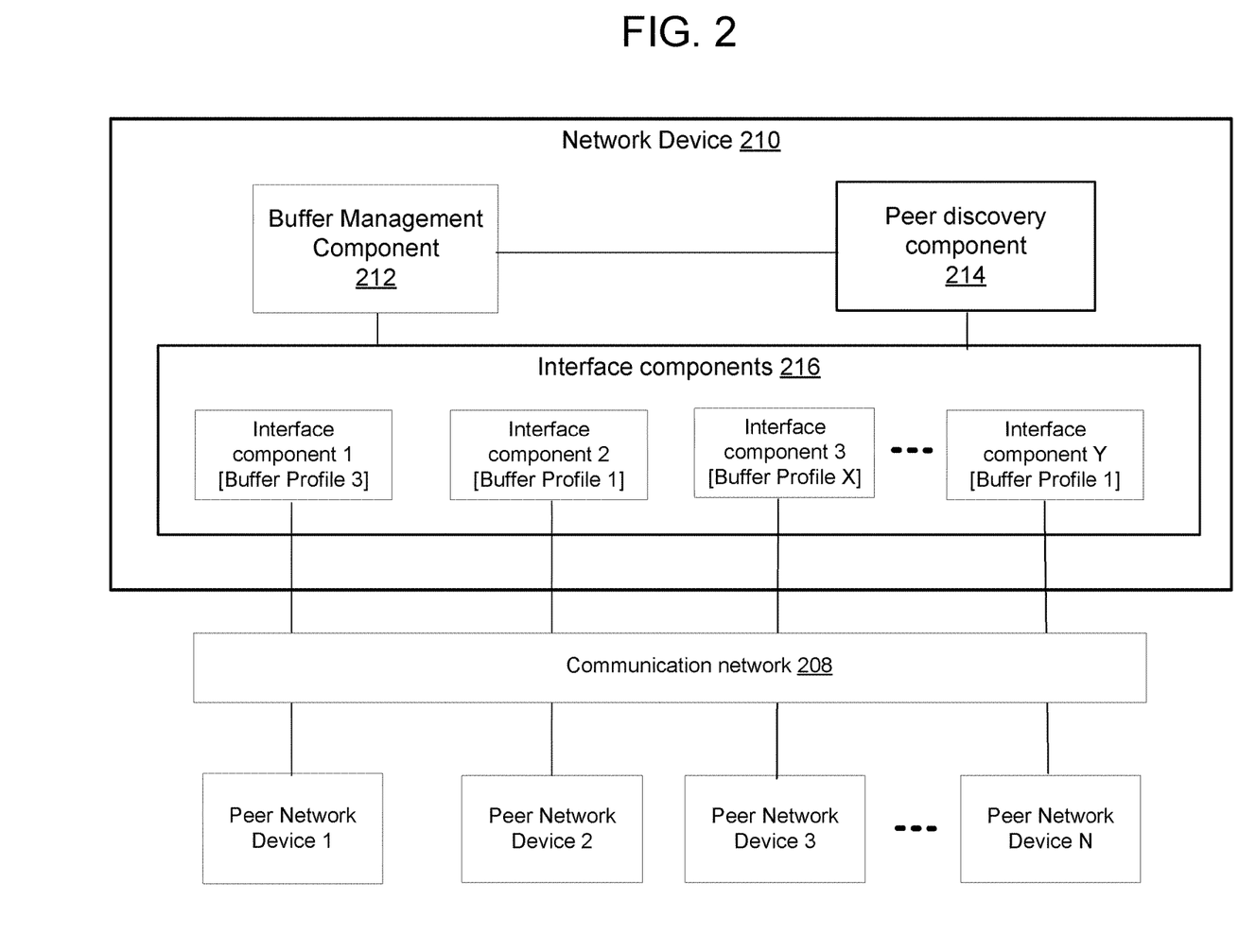
FIG. 2 illustrates a block diagram of an exemplary communication system including a network device configured to discover and couple with one or more peer network devices in accordance with a dynamically assigned buffer profile, in accordance with at least some embodiments.

FIG. 2 illustrates a block diagram of an exemplary communication system 200 including a network device 210 configured to discover and couple with one or more peer network devices (e.g., peer network device 1, peer network device 2, peer network device 3 . . . peer network device N) via a communication network 208. In an embodiment, a communication link between the network device 210 and a respective peer network device can be establish via an interface component of a set of interface components 216.

In an embodiment, the network device 210 can include a buffer management component 212 and a peer discovery component 214 operatively coupled to the interface components 216. In an embodiment, the peer discovery component 214 is an application executable by the network device 210 to discover new peer network devices, collect data associated with the new peer network devices, and provide the peer network device data with the the buffer management component 212. In an embodiment, the peer discovery component 214 can be configured in accordance with the applicable communication protocol (e.g., the LLDP protocol) to identify the peer network device data. For example, the peer discovery component 214 identifies and collects LLDP data descriptive of other peer network devices that are discovered, such as type-length-value (TLV) information elements (e.g., variable length strings in a standardized format). In an embodiment, the LLDP protocol includes the transmission of advertisements as packets (e.g., LLDP data units) and include TLV elements which contain a particular type of information about the peer network device or interface component transmitting the data. neighbor or peer name field data, a port identifier, etc.

In the example shown in FIG. 2, the peer discovery component 214 discovers a new communication link between interface component 1 of the network device 210 and peer network device 1. The peer discovery component 214 identifies data associated with peer network device 1 and provides the data (i.e., peer network device 1 data) to the buffer management component 312. In an embodiment, the peer network device 1 data may be identified in accordance with a suitable communication protocol, such as the LLDP protocol. In an embodiment, the buffer management component receives a new peer or neighbor communication including the peer network device data from the peer discovery component 314. In the example shown in FIG. 2, the new peer network discovery process is performed by the peer discovery component 214 to identify peer network device data associated with peer network device 2, peer network device 3 . . . peer network device.

In an embodiment, the buffer management component 212 uses the respective peer network device data to identify a corresponding buffer profile of a set of buffer profiles (e.g., buffer profile 1, buffer profile 2, buffer profile 3 . . . buffer profile X) to assign to the respective interface component (e.g., port, queue, priority group, etc.) associated with the communication link with the respective peer network device. In the example shown in FIG. 2, the buffer management component 212 assigns buffer profile 3 to interface component 1 based on the peer network device 1 data. In addition, the buffer management component 212 assigns buffer profile 1 to interface component 2 based on the peer network device 2 data, the buffer management component 212 assigns buffer profile X to interface component 3 based on the peer network device 3 data, and the buffer management component 212 assigns buffer profile 1 to interface component Y based on the peer network device N data. The buffer management component 212 maintains a set of different buffer profiles (e.g., buffer profile 1, buffer profile 2, buffer profile 3 . . . buffer profile X) and dynamically assigns a specific buffer profile and its corresponding set of configuration parameters to a respective interface component associated with a communication link with a peer network device. Advantageously, the buffer management component 212 determines which buffer profile to assign to a respective interface component coupled to a peer network device based on the data associated with that particular peer network device. Accordingly, the buffer management component 212 assigns a selected buffer profile to an interface component based on the peer network device data, thereby providing flexibility to the management of the network and eliminates the need for a user to statically assign buffer profiles when deployment of network devices is extended.

Figure 3:
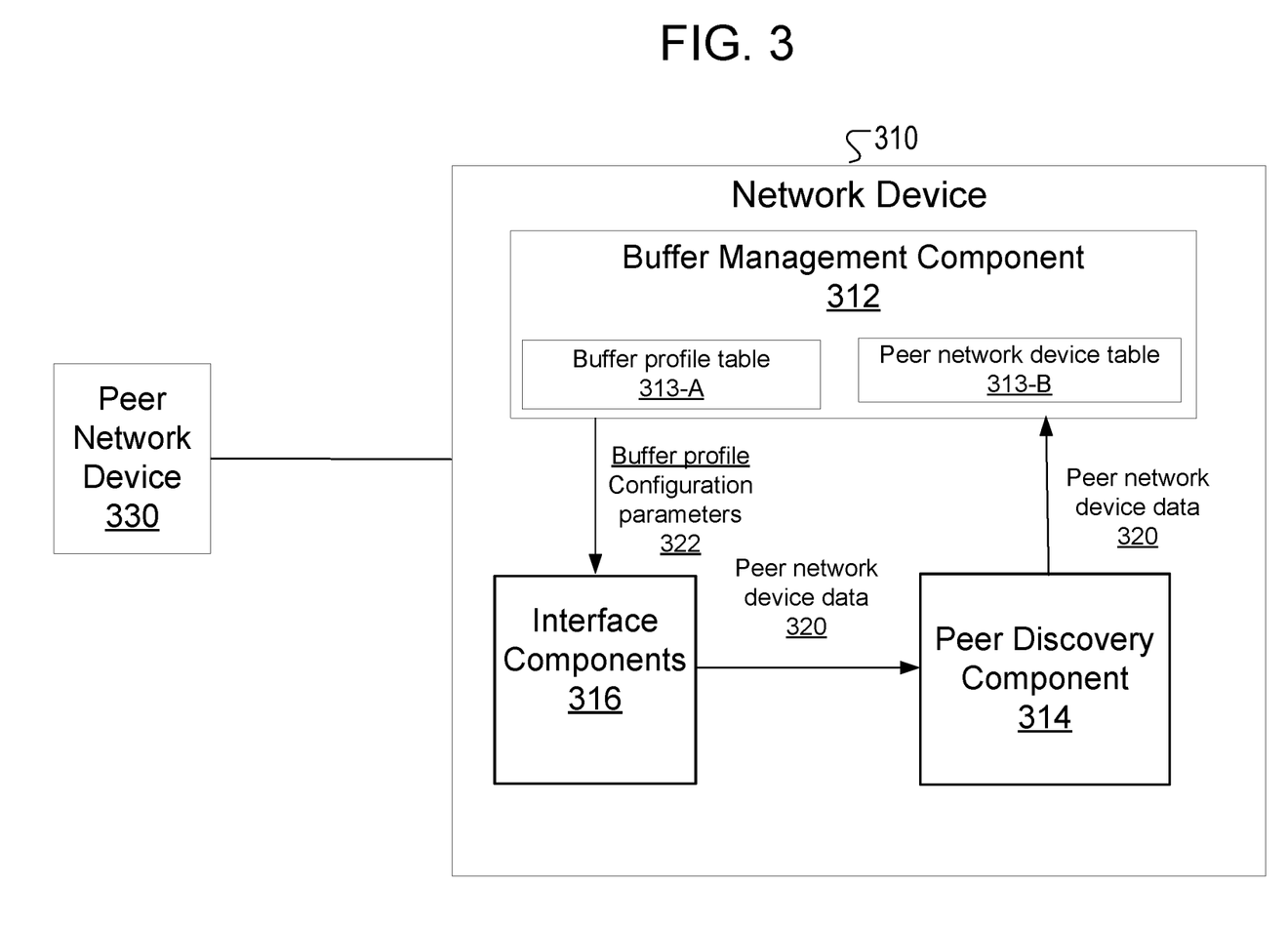
FIG. 3 illustrates a block diagram of an example network device communicatively coupled to a peer network device via an interface component having a dynamically assigned buffer profile, in accordance with at least some embodiments.

FIG. 3 illustrates a block diagram of an example network device 310 communicatively coupled to a peer network device 330, according to embodiments of the present application. As illustrated, the network device 310 includes a buffer management component 312, a peer discovery component 314 and a set of one or more interface components 316.

In an embodiment, the buffer management component 312 maintains a first data structure (buffer profile table 313-A) and a second data structure (peer network device table 313-B) for use in determining a buffer profile to an interface component 316 associated with a communication link with a peer network device 330. In an embodiment, the buffer profile table 313-A stores a set of buffer profile types. Each buffer profile type is associated with one or more configuration parameters that can be used to configure a buffer associated with an interface component corresponding to a communication link between the network device and a peer network device (e.g., peer network device 330). In an embodiment, each buffer profile (e.g., Profile 1, Profile 2, Profile 3 . . . Profile X) includes a set of one or more buffer configuration parameters.

In an embodiment, the peer network device table 313-B includes peer network device data including respectivie peer network device identifiers which are each associated with a respective buffer profile type. In an embodiment, the peer discovery component 314 identifies and collects peer network device data 320 from an interface component 316. The peer discovery component 314 provides at least a portion of the peer network device data 320 to the buffer management component 312. In an embodiment, the peer discovery component 314 is an application employing a communication protocol (e.g., the LLDP protocol) to discover a new peer network device (e.g., peer network device 320) and provide a notification to the buffer managmeent component 312 which includes at least a portion of the peer network device data.

Figure 4:
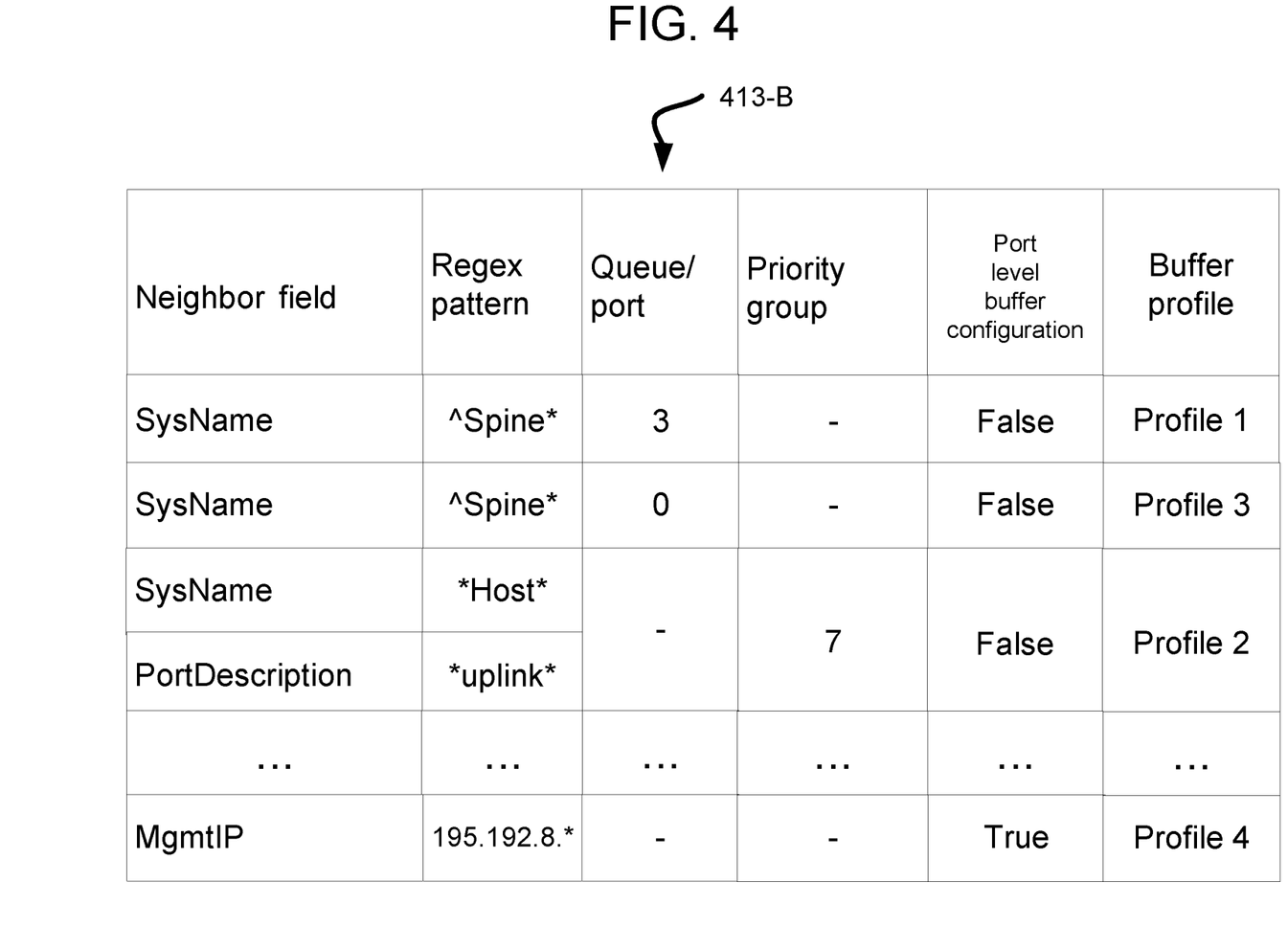
FIG. 4 illustrates an example peer network device table, according to embodiments of the present application, in accordance with at least some embodiments.

In an embodiment, in response to receipt of the notification including at least a portion of the peer network device data, the buffer management component 312 compares the peer network device data to the data stored in the peer network device table 413-B. In an embodiment, the buffer management component 312 executes the comparison to determine if an entry in the peer network device table 413-B matches the peer network device data. If a match is identified, the buffer management component 312 identifies the buffer profile that corresponds to the matching peer network device data.

FIG. 4 illustrates an example peer network device table 413-B, according to embodiments of the present application. As shown in FIG. 4, the peer network device table 413-B includes a set of entries corresponding to different peer network device types as defined by a peer network device identifier. In the example shown, each of the set of entries of the peer network device table 413-B includes a set of values corresponding to peer network device data fields (e.g., Neighbor Field, Regex Pattern that should be matched on the field) and a corresponding buffer profile type (e.g., Profile 1, Profile 2, Profile 3 . . . Profile X) along with the specific object in port where the buffer profile needs to be associated with (Queue/port, Priority Group, Port Level Buffer Configuration). For example, a first entry in the peer network device table 413-B includes a first value (i.e., "SysName") for a Neighbor field, a second value (i.e., "^Spine*") for a regex pattern field to match in SysName field, a third value (i.e., "3") for a queue/port field, a fourth value (i.e., "-" or null) for a priority group field, a fifth value (i.e., "False") for a port level buffer configuration field, and a sixth value (i.e., "Profile 1") for a buffer profile field. In an embodiment, the peer network device table 413-B can have one or more additional fields and values for each entry. It is noted that the peer network device table 413-B can have one or more fewer fields than those shown in the example data structure of FIG. 4.

In an embodiment, one or more of the fields of the peer network device table 413-B represent a peer network device identifier. In an embodiment, the peer network device identifier field is searched or queried using the discovered peer network device data to determine if the an entry stored in the peer network device table 413-B matches.

With reference to the example shown in FIG. 4, the buffer management component (e.g., buffer management component 312 of FIG. 3) performs a search or query of one or more fields of the peer network device table 413-B to identify a match. In an example, the buffer management component searches the regex pattern on the Neighbor field specified in the first value and, if a neighbor matches that specific pattern on the Neighbor field specified, the buffer profile associated with the matching entry is used to configure the corresponding interface component that is associated with Queue or Priority group or port level buffer configuration. For example, the discovered peer network device data SysName (e.g., a neighbor field value) can be compared to the regex pattern field to identify a role or type of the peer network device. In an embodiment, one or more other fields of the peer network device table can be used to identify the role of the peer network device and corresponding buffer profile type to be assigned to the interface component.

For example, the regex pattern field can include as values comprising a sequence of characters. Similar peer network devices have a sequence of characters in the regex pattern in common. For example, all spine devices may have a common name sharing convention, such as a first spine device can have a regex pattern value of "Spine00100X", a second spine device can have a regex pattern value of "Spine00200X", and so on.

With reference to FIG. 3, in an embodiment, the peer network device table 313-B can include one or more customized or user-defined TLV fields (also referred to as a "vendor-specific field") that can be compared to the peer network device data 320 to identify a match. For example, the user-defined field can be customized as a "device type" field which includes values corresponding to the type of the peer network device. In an embodiment, the device type field can replace one or more of the "neighbor field" and the "regex pattern field" of the peer network device table 413-B of FIG. 4. In an embodiment, the LLDP protocol allows for the setting of vendor-specific TLV fields and entries. In an embodiment, since the standard LLDP protocol does not include a "device type" field or value, a user-defined "device type" field can be generated and used in the peer network device table 313-B, such that the user-defined field is searched for matching purposes.

With reference to FIG. 3, in an embodiment, having identified a buffer profile type corresponding to the matching entry in the peer network device table 313-B, the buffer management component 312 uses the buffer profile table 313-A to identify one or more configuration parameters corresponding to the identified buffer profile. As described above, the buffer profile table 313-A includes a set of entries where each entry includes a buffer profile types (e.g., Profile 1, Profile 2, Profile 3 . . . Profile X) and a corresponding set of one or more buffer configuration parameters.

Figure 5:
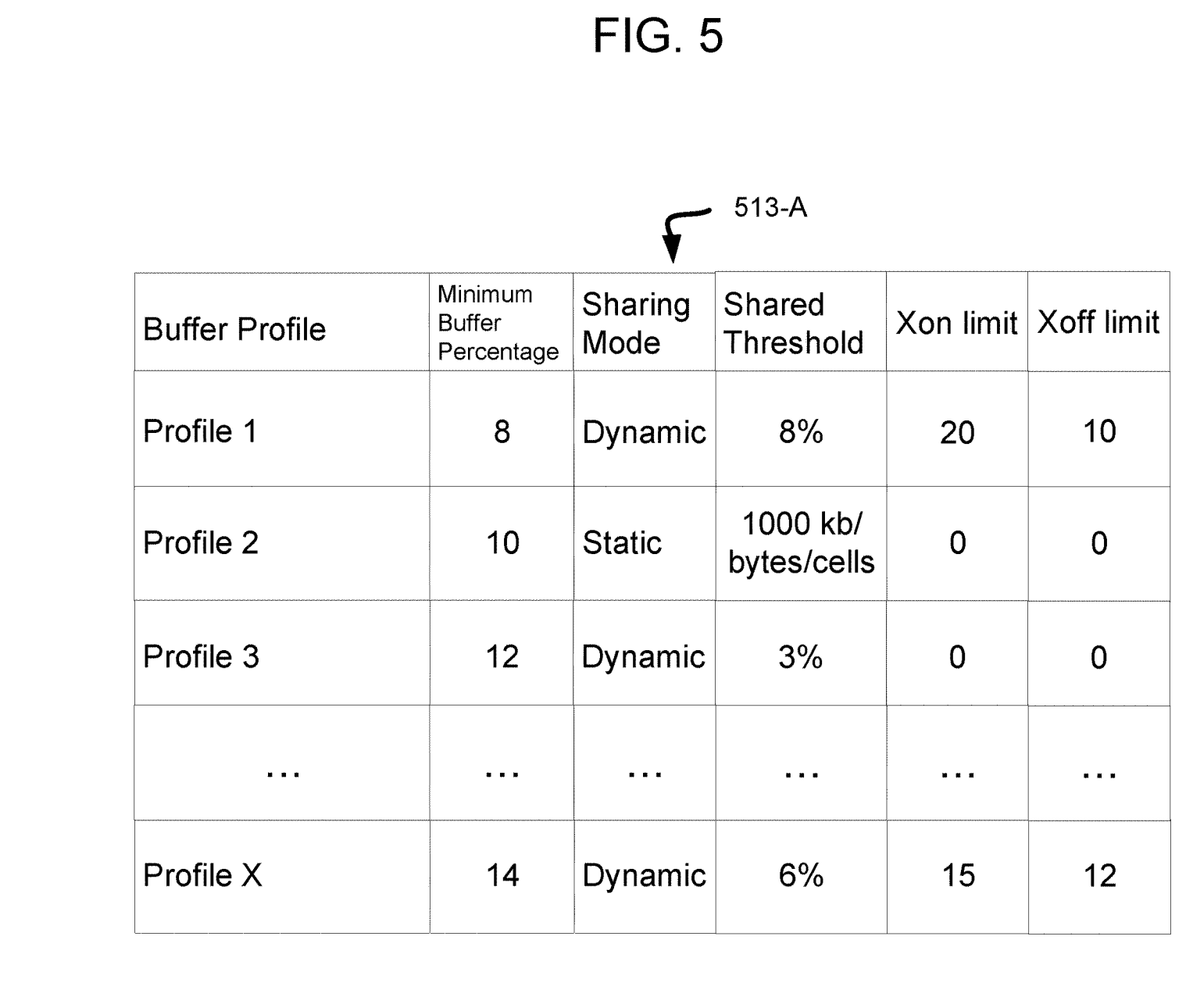
FIG. 5 illustrates an example buffer profile table, in accordance with at least some embodiments.

FIG. 5 illustrates an example buffer profile table 513-A, according to embodiments of the present application. As shown in FIG. 5, the buffer profile table 513-A includes a set of entries corresponding to different buffer profile types. In the example shown, each entry of the set of entries of the buffer profile table 513-A includes a set of buffer configuration parameter values corresponding to different buffer configuration parameter fields (e.g., a minimum buffer percentage, sharing mode, shared threshold, Xon limit, Xoff limit).

In an embodiment, the set of buffer configuration parameters can include a minimum buffer percentage representing a minimum percentage of the overall buffer amount that is to be allocated to an interface component associated with a peer network device. In an embodiment, the set of buffer configuration parameters can include a sharing mode type representing one of a static buffer configuration mode or a dynamic buffer configuration mode. The static configuration mode includes statically allocating a buffer size (e.g., X kbs). The dynamic configuration mode includes allocating a minimum threshold buffer size and the sharing of an allotment of buffer with other peer network devices in the system. For example, in the dynamic sharing mode, an alpha network device is identified and tasked with determining how much of the available buffer a particular interface component (e.g., a port, a queue in a port, etc.) can use. It is noted that the dynamic shared mode does not include the dynamic assignment of buffer profiles, as performed by the buffer management component of embodiments of the present application. Instead, the dynamic shared mode relates to the manner in which an interface component shares the available buffer with other peer network devices.

In an embodiment, with reference to FIG. 5, the set of configuration parameters can include a shared threshold amount or level representing a threshold level of the allocated buffer can be shared by a respective interface component. In an embodiment, the set of configuration parameters can include an Xon limit and a Xoff limit. In an embodiment, a pause frame may be generated when an ingress queue at an interface component falls below the Xon limit (e.g., the minimum or lower threshold level). In an embodiment, a pause frame may be generated when the buffer limit at an ingress interface component reaches or exceeds the Xoff limit (e.g., the maximum or upper threshold level) associated with the interface component. It is noted that any combination of buffer configuration parameters can be stored in association with a buffer profile type in the buffer profile table 513-A.

In an embodiment, the buffer profile table 513A includes a respective entry corresponding to the assignable buffer profiles, where each entry includes a set of one or more buffer configuration parameters to be assigned to a corresponding interface component associated with a peer network device. For example, a first entry in the buffer profile table 513A includes a first value (i.e. "Profile 1") for a buffer profile field, a second value (i.e., "8") for a minimum buffer percentage field, a third value (i.e., "Dynamic") for a sharing mode field, a fourth value (i.e., "8%") for a shared threshold field, a fifth value (i.e., "20") for an Xon limit field and a sixth value (i.e., "10") for an Xoff limit field. In an embodiment, the set of values correonding to the buffer configuration parameter fields can be used to configure the interface component associated with the peer network device. In an embodiment, the buffer profile table 513-A can have one or more additional fields and values for each entry. It is noted that the buffer profile table 513-A can have one or more fewer fields than those shown in the example data structure of FIG. 5.

As illustrated in the example buffer profile table 513-A of FIG. 5, having identified the buffer profile to be dynamically assigned, the buffer management component can perform a look-up operation using the buffer profile table 513-B to identify the one or more buffer configuration parameters and values to assign to the interface component of the discovered peer network device.

In an embodiment, with reference to FIG. 3, the buffer profile table 313-A and the peer network device table 313-B and corresponding data fields and values can be combined into a single data structure. For example, the buffer management component 312 can maintain one data structure that includes the fields of the peer network device table and the buffer profile table.

Figure 6:
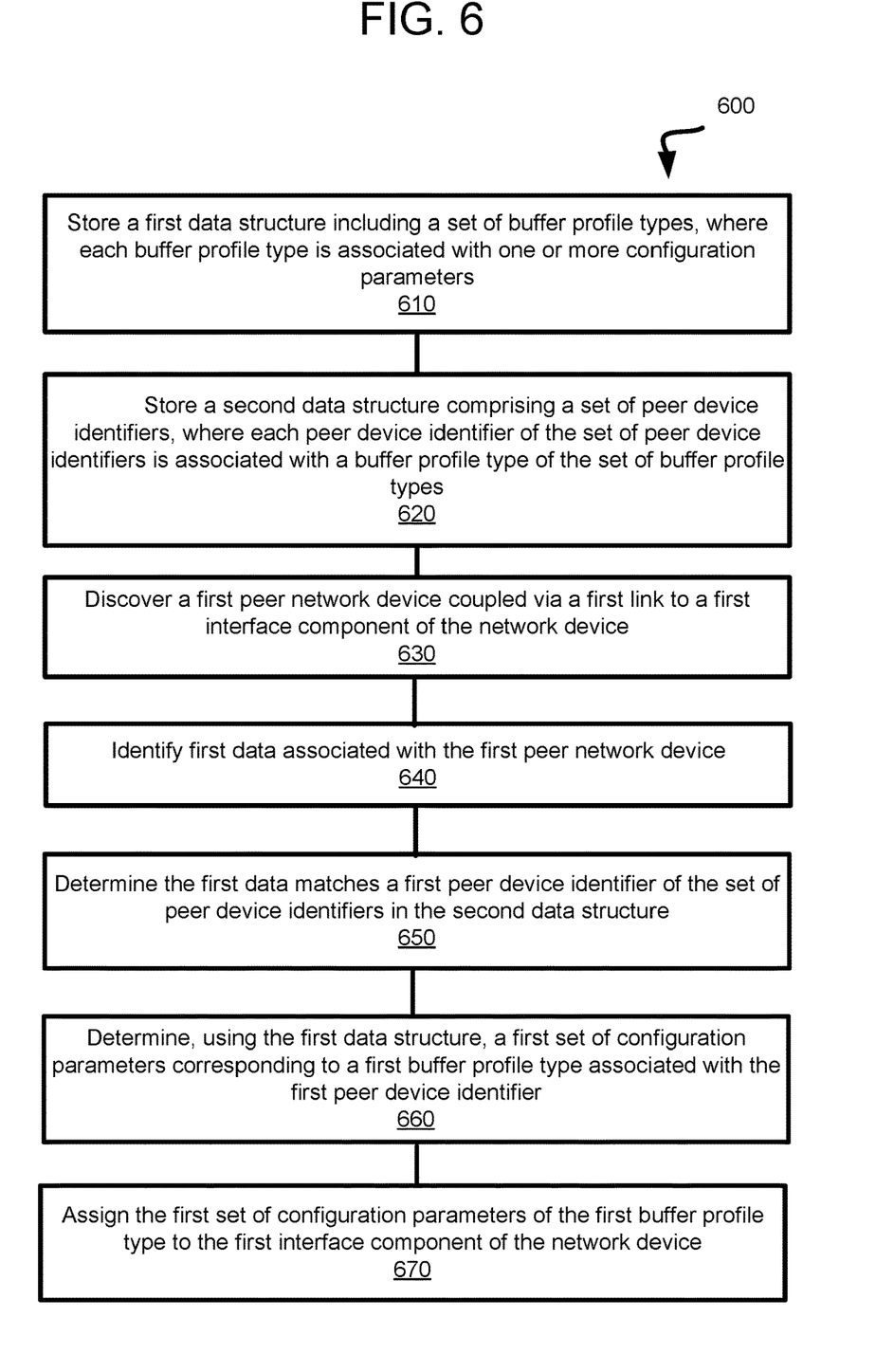
FIG. 6 is a flow diagram of a method of dynamically assigning a set of configuration parameters of an identified buffer profile to an interface component associated with a communication link with a peer network device based on data associated with the peer network device, in accordance with at least some embodiments.

FIG. 6 is a flow diagram of a method 600 of dynamically assigning a set of configuration parameters of an identified buffer profile to an interface component associated with a communication link with a peer network device based on data associated with the peer network device. The method 600 can be performed by processing logic comprising hardware, software, firmware, or any combination thereof. In at least one embodiment, the method 600 is performed by the buffer management component 112 of FIG. 1, the buffer management component 212 of FIG. 2, or the buffer management component 312 of FIG. 3. In at least one embodiment, the method 600 is performed by the buffer management component, as directed by control logic, which is processing logic in some embodiments. According to embodiments, the method 600 can be performed by a network device within a network communication system including one or more discoverable peer network devices, in accordance with embodiments of the present application. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic stores a first data structure including a set of buffer profile types, where each buffer profile type is associated with one or more configuration parameters. In an embodiment, the processing logic of the buffer management component stores and maintains the first data structure (e.g., the buffer profile table 313-A of FIG. 3 or the buffer profile table 515-A of FIG. 5) including a series of fields and corresponding values associated with buffer configuration parameters relating to each respective buffer profile.

At operation 620, the processing logic stores a second data structure comprising a set of peer device identifiers, where each peer device identifier of the set of peer device identifiers is associated with a buffer profile type of the set of buffer profile types. In an embodiment, the processing logic of the buffer management component stores and maintains the second data structure (e.g., the peer network device table 313-B of FIG. 3 or the peer network device table 415-B of FIG. 4) including a series of fields and corresponding values associated with one or more peer network devices and peer network device types. In an embodiment, the second data structure includes one or more searchable fields and values that can be used to identify a peer network device type (e.g., a peer device identifier) and a corresponding buffer profile type.

At operation 630, the processing logic discovers a first peer network device coupled via a first link to a first interface component of the network device. In an embodiment, the processing logic can include a peer discovery component that discovers a new peer network device that is to be coupled via a communication link (e.g., the first link) to the network device via an interface component (e.g., the first interface component) of the network device. For example, with reference to FIG. 2, the first peer network device that is discovered is peer network device 3 which is discovered via interface component 3 of the network device 210.

At operation 640, the processing logic identifies first data associated with the first peer network device. In an embodiment, the first data associated with the first peer network device can be collected and identified during discovery of the first peer network device. The first data can be any data associated with the first peer network device that can be used for comparison with the data stored in the second data structure. For example, if the network device uses an LLDP communication protocol, the first data can be LLDP-based descriptive information associated with the discovered peer network device. In an embodiment, the first data can include one or more user-defined data values for use in comparison with the second data structure including one or more user-defined data fields (e.g., a device type field).

At operation 650, the processing logic determines the first data matches a first peer device identifier of the set of peer device identifiers in the second data structure. In an embodiment, as described above, the processing logic of the buffer managment component can perform a look-up operation or search of the one or more data fields of the second data structure to determine if the first data associated with the first peer network device matches an entry in the second data structure. For example, the processing logic can search the regex pattern field of the second data structure to determine if a match is found with the Neighbor field specified in the second data structure on the first data. In another example, the processing logic can search a user-defined field of the second data structure to determine if a match is found with the first data. In an embodiment, if in operation 650 it is determined that no match is found between the first data and the entries of the second data structure, the processing logic can assign a default buffer profile to the first peer network device.

At operation 660, the processing logic determines, using the first data structure, a first set of configuration parameters corresponding to a first buffer profile type associated with the first peer device identifier. In an embodiment, the processing logic performs a look-up operation of the first data structure to identify the set of configuration parameters associated with the buffer profile type (e.g., the first buffer profile type) associated with the matching entry of the second data structure (e.g., the matching peer network device type).

At operation 670, the processing logic assigns the first set of configuration parameters of the first buffer profile type to the first interface component of the network device specified in the queue or priority group or port level of the second data structure (i.e., the interface component information). In an embodiment, the set of configuration parameters are dynamically assigned to define the buffer for the interface component corresponding to the communication link with the peer network device. For example, the configuration parameters are assigned and applied to establish a buffer size for the interface component associated with the communication link with the peer network device.

Figure 7:
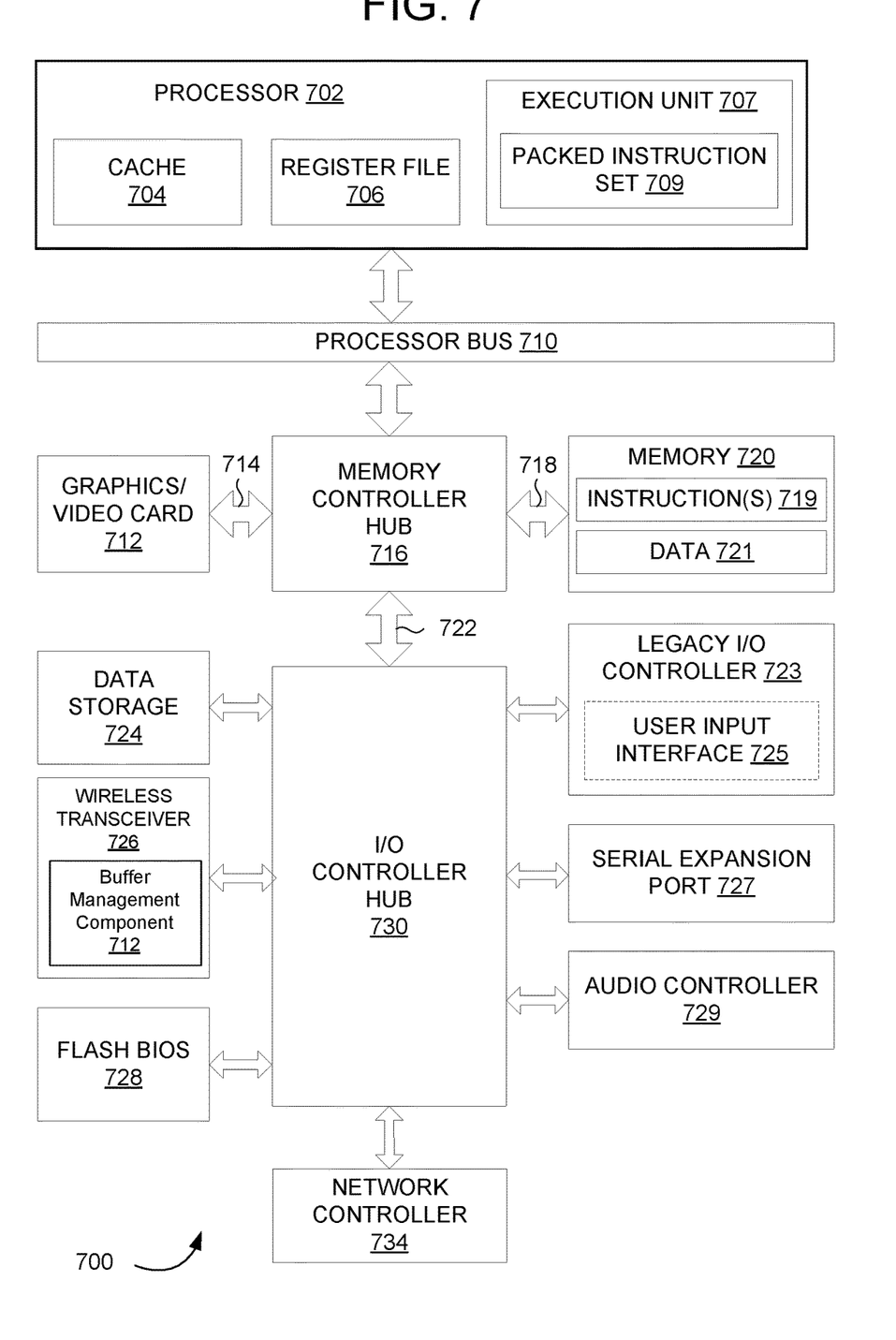
FIG. 7 illustrates an example computer system including a wireless transceiver including a buffer management component, in accordance with at least some embodiments.

FIG. 7 illustrates a computer system 700, in accordance with at least one embodiment. In at least one embodiment, computer system 700 may be a system with interconnected devices and components, an SOC, or some combination. In at least on embodiment, computer system 700 is formed with a processor 702 that may include execution units to execute an instruction. In at least one embodiment, computer system 700 may include, without limitation, a component, such as processor 702 to employ execution units including logic to perform algorithms for processing data. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 700 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 700 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 700 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 700 may include, without limitation, processor 702 that may include, without limitation, one or more execution units 707 that may be configured to execute a Compute Unified Device Architecture ("CUDA") (CUDA® is developed by NVIDIA Corporation of Santa Clara, Calif.) program. In at least one embodiment, a CUDA program is at least a portion of a software application written in a CUDA programming language. In at least one embodiment, computer system 700 is a single processor desktop or server system. In at least one embodiment, computer system 700 may be a multiprocessor system. In at least one embodiment, processor 702 may include, without limitation, a CISC microprocessor, a RISC microprocessor, a VLIW microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. In at least one embodiment, processor 702 may also include a combination of both internal and external caches. In at least one embodiment, a register file 706 may store different types of data in various registers including, without limitation, integer registers, floating point registers, status registers, and instruction pointer register.

In at least one embodiment, execution unit 707, including, without limitation, logic to perform integer and floating point operations, also resides in processor 702. Processor 702 may also include a microcode ("ucode") read only memory ("ROM") that stores microcode for certain macro instructions. In at least one embodiment, execution unit 707 may include logic to handle a packed instruction set 709. In at least one embodiment, by including packed instruction set 709 in an instruction set of a general-purpose processor 702, along with associated circuitry to execute instructions, operations used by many multimedia applications may be performed using packed data in a general-purpose processor 702. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 700 may include, without limitation, a memory 720. In at least one embodiment, memory 720 may be implemented as a DRAM device, an SRAM device, flash memory device, or other memory device. Memory 720 may store instruction(s) 719 and/or data 721 represented by data signals that may be executed by processor 702.

In at least one embodiment, a system logic chip may be coupled to processor bus 710 and memory 720. In at least one embodiment, the system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and a system I/O 722. In at least one embodiment, system logic chip may provide a graphics port for coupling to a graphics controller. In at least one embodiment, MCH 716 may be coupled to memory 720 through high bandwidth memory path 718 and graphics/video card 812 may be coupled to MCH 716 through an Accelerated Graphics Port ("AGP") interconnect 714.

In at least one embodiment, computer system 700 may use system I/O 722 that is a proprietary hub interface bus to couple MCH 716 to I/O controller hub ("ICH") 730. In at least one embodiment, ICH 730 may provide direct connections to some I/O devices via a local I/O bus. In at least one embodiment, local I/O bus may include, without limitation, a high-speed I/O bus for connecting peripherals to memory 720, a chipset, and processor 702. Examples may include, without limitation, an audio controller 729, a firmware hub ("flash BIOS") 728, a wireless transceiver 726, a data storage 724, a legacy I/O controller 723 containing a user input interface 725 and a keyboard interface, a serial expansion port 727, such as a USB, and a network controller 734. Data storage 724 may comprise a hard disk drive, a floppy disk drive, a CD-ROM device, a flash memory device, or other mass storage device. In an embodiment, the wireless transceiver 726 includes a buffer management component 712 (e.g., the buffer management component 112, 212, and 312 of FIGS. 1, 2, and 3, respectively.

In at least one embodiment, FIG. 7 illustrates a system, which includes interconnected hardware devices or "chips." In at least one embodiment, FIG. 7 may illustrate an exemplary SoC. In at least one embodiment, devices illustrated in FIG. 7 may be interconnected with proprietary interconnects, standardized interconnects (e.g., PCIe), or some combination thereof. In at least one embodiment, one or more components of system 700 are interconnected using compute express link ("CXL") interconnects.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A network device comprising:
   a first data structure storing a set of buffer profile types, wherein each buffer profile type is associated with one or more configuration parameters;
   a second data structure storing a set of peer device identifiers, wherein each peer device identifier of the set of peer device identifiers is associated with a buffer profile type of the set of buffer profile types; and
   a processing device to execute a buffer management application to:
   receive first data associated with a first peer network device coupled via a first link to an interface component of the network device;
   determine the first data matches a first peer device identifier stored in the second data structure; and
   assign a first buffer profile type to the interface component of the network device, wherein the first buffer profile type is associated with the first peer device identifier in the second data structure.

2. The network device of claim 1, wherein the one or more configuration parameters comprises at least one of a minimum guaranteed threshold level, a shared mode type, an endpoint buffer upper limit, or an endpoint buffer lower limit.

3. The network device of claim 1, wherein the interface component comprises at least one of a port, a queue, or a priority group.

4. The network device of claim 1, the buffer management application further to:
   identify, using the first data structure, a first set of configuration parameters associated with the first buffer profile type; and
   configure the interface component in accordance with the first set of configuration parameters associated with the first buffer profile type.

5. The network device of claim 1, wherein the set of peer device identifiers comprises an identifier associated with a link layer discovery protocol (LLDP) corresponding to the first link between the network device and the first peer network device.

6. The network device of claim 1, wherein the processing device executes a link management application to:
discover the first peer network device coupled to the network device via the first link;
identify the first data associated with the first peer network device; and
provide the first data to the buffer management application.

7. The network device of claim 1, wherein the set of peer device identifiers comprise one or more user-defined identifiers.

8. The network device of claim 7, wherein the one or more user-defined identifiers comprise a network device type.

9. The network device of claim 1, the buffer management application to perform a first look-up operation using the second data structure to search the set of peer device identifiers to identify a match between the first data and the first peer device identifier.

10. The network device of claim 9, the buffer management application to perform a second look-up operation wherein the second look-up operation using the first data structure to identify a first set of configuration parameters associated with the first buffer profile type.

11. The network device of claim 1, wherein the second data structure comprises a first set of fields comprising the set of peer device identifiers associated with a second set of fields comprising the set of buffer profile types.

12. The network device of claim 1, the buffer management application to:
receive second data associated with a second peer network device coupled via a second link to the network device;
determine the second data matches a second peer device identifier stored in the second data structure; and
assign a second buffer profile type to a second interface component of the network device, wherein the second buffer profile type corresponds to the second peer device identifier in the second data structure.

13. A method comprising:
storing a first data structure comprising a set of buffer profile types, wherein each buffer profile type is associated with one or more configuration parameters;
storing a second data structure comprising a set of peer device identifiers, wherein each peer device identifier of the set of peer device identifiers is associated with a buffer profile type of the set of buffer profile types;
discovering, by a processing device of a network device, a first peer network device coupled via a first link to a first interface component of the network device;
identifying first data associated with the first peer network device;
determining the first data matches a first peer device identifier of the set of peer device identifiers in the second data structure;
determining, using the first data structure, a first set of configuration parameters corresponding to a first buffer profile type associated with the first peer device identifier; and
assigning the first set of configuration parameters of the first buffer profile type to the first interface component of the network device.

14. The method of claim 13, further comprising:
configuring the first interface component of the network device in accordance with the first set of configuration parameters.

15. The method of claim 13, further comprising:
discovering the first peer network device coupled to the network device via the first link.

16. The method of claim 13, further comprising:
searching at least a portion of the set of peer device identifiers of the second data structure to identify a match between the first data and the first peer device identifier.

17. The method of claim 13, further comprising:
searching at least a portion of the set of buffer profile types of the first data structure to identify a first set of configuration parameters associated with the first buffer profile type.

18. The method of claim 13, further comprising:
discovering a second peer network device coupled via a second link to a second interface component of the network device;
identifying second data associated with the second peer network device;
determining the second data matches a second peer device identifier of the set of peer device identifiers in the second data structure;
determining, using the first data structure, a second set of configuration parameters corresponding to a second buffer profile type associated with the second peer device identifier; and
assigning the second set of configuration parameters of the second buffer profile type to the second interface component of the network device.

19. The method of claim 18, further comprising:
configuring the second interface component of the network device in accordance with the second set of configuration parameters.

20. A network device comprising:
a plurality of interface components;
a data structure that associates each peer device identifier of a set of peer device identifiers to a buffer profile type of a set of buffer profile types; and
a processing device coupled to the plurality of interface components, the processing device to execute a buffer management application to:
receive first data associated with a first peer network device coupled via a first link to an interface component of the network device;
determine the first data matches a first peer device identifier stored in the data structure; and
assign a first buffer profile type to the interface component of the network device, wherein the first buffer profile type is associated with the first peer device identifier.

* * * * *